Nov. 18, 1969 P. J. SHAVER 3,479,257
METHODS AND APPARATUS FOR MEASURING THE CONTENT OF HYDROGEN
OR REDUCING GASES IN AN ATMOSPHERE
Filed Nov. 25, 1966
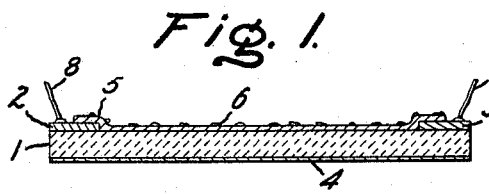
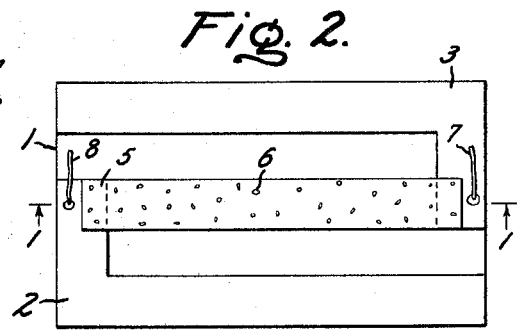
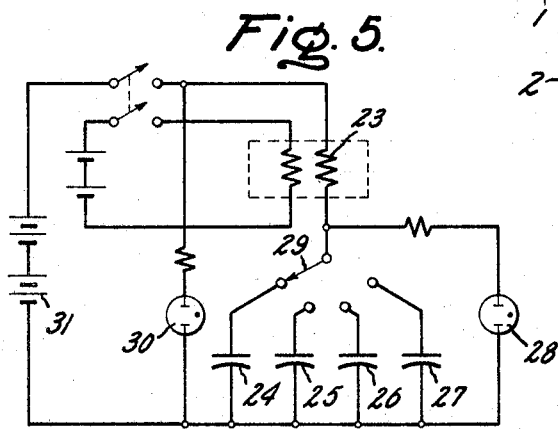
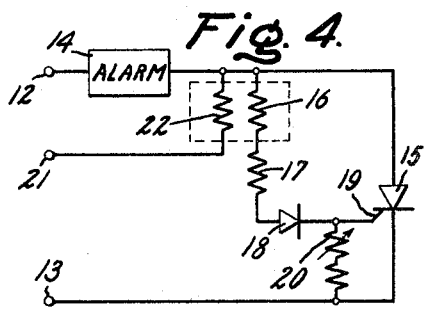
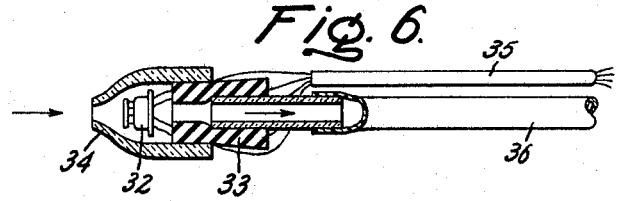
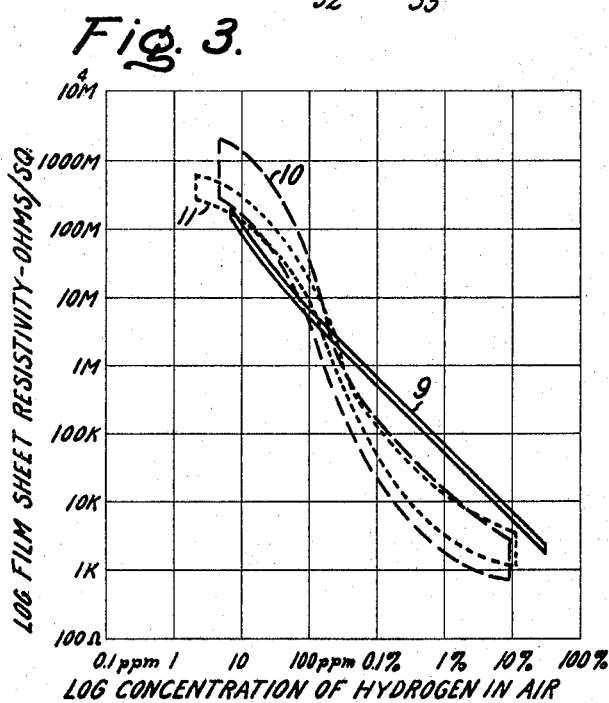
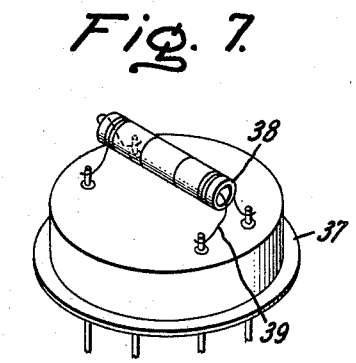
Inventor:
Paul J. Shaver,
by Paul A. Frank
His Attorney.

United States Patent Office
3,479,257
Patented Nov. 18, 1969

3,479,257
METHODS AND APPARATUS FOR MEASURING THE CONTENT OF HYDROGEN OR REDUCING GASES IN AN ATMOSPHERE
Paul J. Shaver, Scotia, N.Y., assignor to General Electric Company, a corporation of New York
Filed Nov. 25, 1966, Ser. No. 603,698
Int. Cl. C23b 5/50; B01k 3/00
U.S. Cl. 204—1                 13 Claims

ABSTRACT OF THE DISCLOSURE

The content of hydrogen or reducing gases in an atmosphere is quantitatively determined by measuring the change in resistance of a thin film of metal oxide whose surface has been activated by the deposition of a catalyst.

---

My invention relates to methods and apparatus for detecting gases and in particular to methods and apparatus for quantitatively measuring the content of hydrogen or reducing gases in an atmosphere.

The need for reliable, inexpensive devices for measuring the concentration of hydrogen and reducing gases in an atmosphere, whether desired or undesired and, for example, caused by leaks, incomplete combustion, decomposition, and the like, has long been recognized. Many arrangements and devices have been suggested for this purpose. One such device senses changes in the thermal conductivity of the gas ambient as the content of an impurity gas is changed. A device of this sort measures the change in electrical resistance of a resistor that is subjected to temperature changes which are caused by changes in the thermal power loss from the resistor due to changes in the thermal conductivity of the ambient gas. The resistor can have either a positive or negative temperature coefficient of resistivity. The resistor is typically made in the form of bulk, thin film, or fine wire geometries and is typically constructed of a metal, metal alloy or a semiconductor.

Another type of device depends on an exothermic reaction between the impurity gas and the normal ambient gas at a catalytic surface which surrounds a resistor to raise the temperature of a negative temperature coefficient resistor and thus lower its resistance. Another arrangement described in Analytical Chemistry, vol. 38, No. 8, July 1966, pages 1069–1073, employs thin films of various metals and metal oxides, such as zinc oxide as a detector of various impurity gases. This arrangement relies upon the chemisorption of various gases on the thin films operated at elevated temperatures to produce changes in the electrical resistance which can be related to the concentration of these gases. All such systems have a long response time and also employ high temperatures which are of the order of 500° C.

It is an object of my invention to provide a new and improved gas detector which is of simple construction and inexpensive to manufacture.

It is another object of my invention to provide new and improved methods and apparatus for quantitatively measuring the concentration of hydrogen or reducing gases in an atmosphere which has a rapid response time and which is completely reversible in its action.

It is still another object of my invention to provide new and improved methods and apparatus for detecting and measuring the content of hydrogen or reducing gases in an atmosphere which employs relatively low operating temperatures in order to insure long life for the detector and to minimize explosion hazards.

In its broadest aspect my invention consists of catalytically activating the surface of a semiconducting metallic oxide and using a change in the electrical resistance of the oxide to determine the amount of hydrogen or reducing gas in an atmosphere, the change in the electrical resistance of the semiconducting oxide being caused by chemical reactions between hydrogen or hydrogen containing gases and the oxide in the localized presence of the catalytically activated surface. In one embodiment the metallic oxide comprises a thin film of a semiconductor material on which a catalyst is deposited in the form of minute islands and which is heated to a temperature substantially below the decomposition temperature of the thin film and the oxidation temperature of the bulk catalyst.

The subject matter which I regard as my invention is particularly pointed out and distinctly claimed in the concluding portion of this specification. The invention, however, both as to its organization and method of operation, together with further objects and advantages thereof may best be understood by reference to the following description taken in connection with the accompanying drawings, wherein like reference characters refer to like elements and in which:

FIGURE 1 is a cross-section of a schematic representation of a detector of my invention, FIGURE 2 is a plan view of the detector of FIGURE 1, FIGURE 3 is a sheet of curves illustrating certain operational characteristics of my detector, FIGURE 4 is an electrical circuit diagram illustrating a stationary alarm-type monitor employing my invention, FIGURE 5 is a circuit diagram of a portable survey-type monitor employing my invention, FIGURE 6 schematically illustrates a hydrogen leak detector employing my invention, and FIGURE 7 illustrates another embodiment of my invention.

The detector of FIGURE 1 is illustrated as comprising a substrate 1 having deposited on one of its surfaces a pair of contacts 2, 3 and on its other surface a thin film 4 of an electrically conductive material used for resistance heating the substrate. Bridging contacts 2 and 3 is a thin film of a metallic oxide 5 on which is deposited an activating catalyst 6 preferably in the form of thin film-like small islands. Suitable electrical leads 7, 8 are connected, respectively to the contacts 2 and 3.

The substrate 1 comprises an inert material which has a high electrical resistivity and no appreciable chemical decomposition at the operating temperatures of the detector. Thus, the substrate may be an amorphous material such as quartz or calcia-silica glass, a polycrystalline material such as alumina, beryllia, or other ceramics, or may comprise a single crystal chip of a highly resistive refractory material such as alumina, yttria, thoria, zirconia, ceria, beryllia, or the like. Whatever material is chosen it should have minimal chemical reaction with the thin film metal oxide deposited on its surface at the operating temperatures of the detector. The electrical contacts 2, 3 may comprise either thin films deposited on the substrate or metal strips or wires which are mechanically bonded to the substrate. The electrical contacts may be made of any material which makes a good electrical contact with the metal oxide 5. Thus, particularly suitable materials comprise platinum, gold, or platinum-gold alloys although other conventional electrically conductive material such as copper, silver, chromium or nickel may be employed. The leads 7, 8 likewise should be formed of a conductive material having a very low electrical resistance. Since the detector is employed for detecting hydrogen, it is desirable that no portion of the detector be raised to the explosive ignition temperature of hydrogen either directly or indirectly by regenerative self heating due to catalyzed surface combustion. In this respect nickel and gold wires are particularly suitable and they may be secured to the contacts 2, 3 by a silver or gold paste or by welding or thermocompression bonding.

The semiconductive thin film 5 which bridges contacts 2, 3 may be comprised of any suitable metallic oxide and preferably is the oxide of a metal selected from the group consisting of tungsten, molybdenum, chromium, niobium, nickel, iron, titanium and the like, or mixtures of such metals. The member 5 is manufactured by depositing a metal film, preferably by vacuum evaporation, between the electrical contact areas of the substrate. Since one theory explanative of the operation of my detector is that the change in electrical resistance is due to a change in charge carrier concentration in the member 5 in response to a change in the ambient hydrogen concentration, it is preferred that this member be comprised of a thin film in order that the response time be as short as possible.

After deposition on the substrate, the thin film 5 is oxidized to the metal oxide and is then activated by depositing on the upper surface thereof a small amount of a catalytic element. For best results the activating catalyst comprises a material which exhibits good oxidation resistance in bulk form at the operating temperatures of the detector. For this purpose I have found that suitable catalysts comprise a metal selected from a group consisting of platinum, iridium, rhodium, gold, or palladium, or mixtures of such metals. The activation process itself involves depositing a small amount of the catalytic element on the thin film 5. This activation appears to produce thin film islands of high catalytic activity on the surface of the metal oxide. In one set of detectors in which the metal oxide thin film comprised tungsten oxide and the catalytic element comprised platinum, the activation process consisted of the deposition of from $1/100$ to several monolayers of platinum on the surface of the tungsten oxide thin film. In this respect, one monolayer is defined as an average surface density of $5 \times 10^{14}$ atoms per square centimeter. One method of depositing the activating film is to vacuum evaporate the platinum from a hot platinum wire source. Activation may also be accomplished in a normal room ambient by directing a stream of air, argon or other inert gas over a hot film of the activating material, in the case of platinum at a temperature of 1400–1650° C., and onto the metal oxide film. Activation may also be achieved by blowing onto the surface of the metal oxide film a stream of air into which is introduced very fine colloidal platinum particles. As seen in FIGURE 1, the activating catalyst appears in the form of thin film islands on the surface of a metal oxide 5. Activation by a catalyst is needed in order to obtain realistically short response and recovery times at the low operating temperatures which are used.

The heater element 4 may be any suitable conductive material such as tin-oxide deposited in film-like form on the opposite surface of the substrate from that on which the detector elements are located. Such a heater may be conventional in form with suitable leads being provided for supplying heating current to the film. FIGURE 2 illustrates in reduced form a plan view of the detector of FIGURE 1 showing the relative positions and dimensions of the contacts 2, 3 and the activated metal oxide thin film 5.

In a detector of my invention in which the metallic oxide film 5 comprises tungsten oxide, the thin film had a light transmission of 2 to 10% in the visible region and a thickness of about 300 Angstrom units. The electrical sheet resistivity of the tungsten metal film was of the order of 100 ohms per square at room temperature. Also in this instance the tungsten metal film was oxidized by heating in air at a temperature of 600–700° C. for a period of about one minute.

In operating the detector of my invention, hydrogen reacts with the metallic oxide in the localized presence of the catalytic centers to produce a dramatic change in the electrical resistance of the metallic oxide thin film. Through the activation process realistically short response and recovery times are achieved as the resistance of the tungsten oxide thin film follows changes in ambient concentration of airborne hydrogen. The curves of FIGURE 3 illustrate the characteristics of a detector of my invention in which the substrate and supported metal oxide is heated to temperatures of between 240–380° C., the metal oxide comprising tungsten oxide and the activating catalyst comprising platinum. In FIGURE 3, $\log_{10}$ concentration (by volume) of hydrogen in air is plotted as abscissa with $\log_{10}$ of the film sheet resistivity in ohms/sq. plotted as abscissa. Curve 9 is the envelope of a family of curves obtained from a number of operations of a detector in which the activating catalyst comprised approximately $1/100$ of a monolayer of platinum on a thin film of tungsten oxide. The operating temperature of the detector was in the range of 240–270° C. The curve labeled 10 represents the envelope of a family of curves describing the operation of a group of detectors on which the amount of activating catalyst was systematically varied between 1 and 4 monolayers of platinum on a tungsten oxide film and each detector was operated at a temperature of 270° C. Curve 11 shows the response characteristic of the detector employed in obtaining the curve 10 when the operating temperature was 380° C. As mentioned previously, only the envelopes of the families of curves which represent the same operating conditions are drawn to preserve graphical clarity. The individual response curves are all smooth curves which lie entirely within their respective envelopes. Curves 10 and 11 support my finding that there is an almost negligible temperature coefficient of resistance for operating temperatures between 240° C. and 380° C.

An examination of FIGURE 3 illustrates dramatically the very large magnitude of the resistance changes produced by airborne hydrogen. The more heavily activated films display a $10^4$ times resistance decrease when exposed to 0.1% hydrogen in air. I have found that this resistance change is a completely reversible effect which is reproducible. Both the response times and the recovery times are of the order of several seconds. The recovery time is found to increase slightly as the concentration of hydrogen in the air to which the detector had been exposed increases. I have further found that the ambient humidity level has no appreciable systematic effect on the equilibrium of the film resistance at a given concentration of airborne hydrogen. On the other hand, the presence of water vapor in the ambient atmosphere does shorten the thin film recovery time after exposure to airborne hydrogen. Furthermore, the detector response time when operated in vacuum or reduced ambient gas pressure is comparable to the response time measured in the normal room ambient. Finally, the detector responds to hydrogen gas that is contained in some inert gas ambient such as nitrogen or argon.

The detector of my invention is responsive not only to airborne hydrogen but responds particularly well to other airborne hydrogen containing gases which easily decompose to yield nascent hydrogen such as, for example, hydrazine, hydrogen sulfide and anhydrous ammonia. For such gases, a platinum activated tungsten oxide detector has a decrease in resistance greater than a factor of 1000 times when exposed to a gas mixture that is approximately 50% air and 50% of the gas in question. The same detector has a decrease of resistance on the order of 1000 times in the presence of methane, ethane, propane, butane, methyl alcohol, and ethyl alcohol. On the other hand, the response is relatively weak so that there is a decrease in resistance less than 100 times to the presence of toluene, benzene, chlorobenzene, hydrogen chloride and Freon 12.

One of the advantages of my activated oxide thin film hydrogen detector is that it is highly sensitive to airborne hydrogen and easily decomposed hydrogen bearing gases.

The detector element itself is of very small size and can literally be built on the head of a pin at a relatively low cost.

A particular advantage of my detector is that it can operate at relatively low operating temperatures of the order of 250° C. This is particularly desirable since this temperature is less than ½ the auto-ignition temperature of airborne hydrogen gas. In addition, the detector exhibits good selectivity to hydrogen, being relatively insensitive to the presence of airborne molecules of the paraffin series of hydrocarbons in concentrations less than 10%.

The detector of my invention is mechanically rugged and can be built in the form of a compact structure on a two-dimensional substrate of arbitrary rigidity. Also, the electrical power required for heating the detector to its operating temperature can be as low as 100 milliwatts or less. Because of these characteristics the detector is particularly suitable for leak detection and explosion protection by means of alarm-type monitoring of ambient hydrogen and hydrazine concentrated in those locations where these substances are found either in gas or liquid form. These locations include hydrogen or hydrazine production plants, storage areas, handling and transportation equipment. Both hydrogen and hydrazine are used in the aerospace industry as rocket propellant fuels so that there is considerable use for this detector at launch pads, in rocket boosters and in spacecraft. Because of the simplicity, small size, low power drain and low cost of the detector, it can be installed in many points of a given system to give comprehensive leak detection and blast hazard protection. My activated oxide thin films may likewise be used for hydrogen leak detection and explosion hazard monitoring in many industrial processes such as liquid air plants, oil refineries, producer gas plants and distribution systems, hydrogenation plants, ammonia plants, electrolytic plating baths, hydrogen atmosphere metallurgical furnaces, bubble chambers, hydrogen cooled electrical machinery, electrical transformers and the like. They can also be used to detect the incomplete combustion of hydrogen containing fuels or the undesired decomposition of materials that result in the liberation of hydrogen.

FIGURE 4 presents the basic electrical circuit for a simple alarm-type airborne hydrogen monitor employing my invention and is merely illustrative of many possible circuits employing my invention. The essential function of the monitor is to open or close a two wire electrical circuit when the detector or monitor encounters a predetermined concentration of airborne hydrogen. In this monitor a source of voltage represented by the terminals 12, 13 is connected through an alarm 14 to a silicon controlled rectifier 15. The resistance changing metal oxide film 16 has one terminal connected to the alarm 14 and its opposite terminal connected through a resistance 17 and a diode 18 to the gate electrode 19 of rectifier 15. A variable resistance 20 for adjusting the sensitivity of the control is connected between gate control electrode 19 and terminal 13. In this monitor the terminals 12, 13 may represent a conventional 110 volt AC supply and terminal 21 which supplies heating current to the heater 22 of the detector is provided with the voltage required for operation of the heater. The alarm 14 may be of the visual type and may comprise, for example, a lamp, or it may be of the audible type and comprise a bell or horn, or it may be of the electrically operating type, controlling the operation of a relay or solenoid valve used to actuate some protective device. In operation, the silicon controlled rectifier 15 is maintained in its cutoff condition normally so that the alarm is inoperative. However, upon the operation of the detector 16 to indicate the presence of an undesirable amount of hydrogen or other unwanted airborne gas, the resistance 16 decreases so that a firing potential is supplied to gate 19 to render the silicon controlled rectifier 15 conductive. This increases the voltage impressed across the alarm and causes its operation. Of course the alarm 14 may comprise any combination of visual, audible and electrically operative alarms.

FIGURE 5 illustrates the circuit diagram of a portable survey type monitor for detecting the presence of hydrogen or other airborne gases. In this arrangement, the catalytically activated metallic oxide element 23 is connected in series circuit with a selected one of capacitors 24-27 to form a relaxation oscillator with the neon tube 28. For a given position of switch 29, which selects one of the capacitors 24-27, the time constant of the charging circuit comprising the element 23 and the selected capacitor is determined by the resistance of the hydrogen sensitive element 23. As the ambient hydrogen concentration increases, the value of the resistance 23 decreases and the flashing frequency which is proportional to $1/RC$ increases. When the flashing frequency reaches 10–20 cycles per second, the neon bulb indicator appears to the human eye to be lighted continuously. The time when the neon bulb first reaches such continuously lighted condition corresponds to a definite value of the product of RC. Since the value of the capacitance is known, the value of the resistance of the hydrogen sensitive thin film is approximately known thus providing an indication of ambient hydrogen concentration. The values of capacitors 24-27 may be selected to correspond to values of hydrogen concentrations of, for example, 50 parts per million, 500 parts per million, 0.5% and 5% hydrogen in air.

In the circuit of FIGURE 5, I provide an on-off indicator in the form of a neon bulb 30 which is connected across the battery 31 to indicate that the detector is in operating condition. By replacing the neon bulb 28 with an audio tone as an output indicator, the pitch or frequency of the audio tone can be made to change with changes in ambient airborne hydrogen concentration. This obviates the necessity for the operator to watch the monitor itself when the portable monitor is used to survey a test area.

FIGURE 6 illustrates certain construction details of a portable hydrogen leak detector embodying my invention. In this construction, detector element 32 is supported by means of a resilient support member 33 within an enclosing shroud 34. Electrical leads 35 supply operating potentials to the detector and a hose 36 connected to a pump (not shown) draws ambient air samples over the detector element. I have found that this detector is particularly suitable for detecting leaks in vessels pressurized with hydrogen or noninflammable forming gas (hydrogen-nitrogen) mixtures. Hydrogen leak rates as small as $10^{-5}$ cubic centimeters per second are easily detected. Leak rates as small as this cause a 30% decrease in the thin film resistance. The sensitivity of operation of such a detector can be changed by varying the volume of the detection head gas shroud and controlling the gas flow rate through the air pump. Decreasing both the volume and gas flow rate will increase the leak rate detection sensitivity. The detector may employ either a visual or audio indicator to signify the presence of leaks of the gas to be detected.

In operating the detectors of my invention over wide ranges of ambient hydrogen gas concentrations, it has been found that the sensitivity of the unit is remarkably stable and that the response time shows substantially little increase in value over a long period of time.

While I have shown a particular configuration of this detector, it is obvious that it can take other forms. Thus, instead of being planar the substrate may be tubular with the activated metallic oxide being either on the inside or the outside of the tube. Placing the activated oxide on the inside of the tube is particularly useful in monitoring equipment where a gas is passed through a tube. Likewise, the heater may comprise instead of a film on the substrate, a wire positioned within a tubular substrate with the activated metallic oxide on the outer surface of the tubular substrate.

FIGURE 7 is a perspective view of a detector of my invention in which the detector is supported on a base 37 such as conventionally used for electron tubes so that the detector may be plugged into an electrical circuit. The substrate 38 is tubular in form with a heating wire 39 passing through the tube. Suitable potentials for the heater are supplied to pins extending from base 37. Additional pins provide connections to the semiconducting metallic oxide thin film.

Since many changes may be made in the configuration as well as in the applications, changes which will be obvious to those skilled in the art, my intent in the appended claims is to cover all such changes and modifications as fall within the true spirit and scope of my invention.

What I claim as new and desire to secure by Letters Patent of the United States is:

1. A detector for hydrogen containing gases comprising a substrate having high electrical resistivity, a semiconducting metal oxide coating on said substrate, a noncontinuous film of an activating catalyst selected from the group consisting of platinum, iridium, rhodium, gold, or palladium and mixtures thereof deposited on said coating, and electrodes connected to said coating at spaced points thereof, whereby the amount of hydrogen in the atmosphere surrounding said detector may be measured by the change in resistivity in said coating.

2. The detector of claim 1 in which the metallic oxide is the oxide of a metal selected from the group consisting of tungsten, molybdenum, chromium, niobium, iron, titanium, and nickel and mixtures thereof.

3. The detector of claim 1 which includes means for heating the coating.

4. The detector of claim 3 in which the metallic oxide is the oxide of a metal selected from the group consisting of tungsten, molybdenum, chromium, niobium, iron, titanium and nickel and mixtures thereof.

5. The detector of claim 3 which includes alarm means connected in circuit with said metallic oxide coating and whose operation is altered by changes in the resistance of said coating.

6. The detector of claim 5 in which said coating is connected between the anode and control electrode of a controlled rectifier.

7. The detector of claim 5 which includes a relaxation oscillator comprising said coating and a capacitor.

8. The detector of claim 1 in which the metal oxide is tungsten oxide.

9. The detector of claim 8 in which the activating catalyst is platinum.

10. The detector of claim 9 in which the coating is on one surface of the substrate and which includes means for heating the other surface of the substrate.

11. The detector of claim 9 in which the activating catalyst is deposited on the semiconducting metallic oxide coating in the form of small islands.

12. The method of indicating the presence of hydrogen and reducing gases in an atmosphere which comprises contacting the atmosphere with an article comprising a supporting substrate, a semiconductive metallic oxide coating on one surface of the substrate, and a noncontinuous film of an activating catalyst selected from the group consisting of platinum, iridium, rhodium, gold, or palladium and mixtures thereof on the coating, and measuring the change in resistance between spaced points on the coating.

13. The method of claim 12 which includes the step of maintaining the semiconductive coating at a temperature between 200° C. and 380° C.

References Cited

UNITED STATES PATENTS

| | | | |
|---|---|---|---|
| 1,077,920 | 11/1913 | Stevens. | |
| 1,968,570 | 7/1934 | Rupp | 317—238 |
| 1,970,804 | 8/1934 | Kerk. | |
| 2,305,539 | 12/1942 | Lowry. | |
| 2,517,382 | 8/1950 | Brinker et al. | 204—195 |
| 3,038,849 | 6/1962 | Preiser. | |
| 3,133,872 | 5/1964 | Miller et al. | |
| 3,377,697 | 4/1968 | Hobbs | 117—212 |
| 3,386,894 | 6/1968 | Steppat | 117—212 |

OTHER REFERENCES

Seiyama et al., "Analytical Chemistry," vol. 38, No. 8, July 1966, pp. 1069–1073.

JOHN H. MACK, Primary Examiner

T. TUNG, Assistant Examiner

U.S. Cl. X.R.

23—232, 254; 204—195, 274